Dec. 19, 1922.

W. B. YOUNG.
WOOD CARVING MACHINE.
FILED AUG. 25, 1921.

INVENTOR
W. B. Young
BY Munn & Co.
ATTORNEYS

Patented Dec. 19, 1922.

1,439,215

UNITED STATES PATENT OFFICE.

WILLIAM B. YOUNG, OF CHICAGO, ILLINOIS.

WOOD-CARVING MACHINE.

Application filed August 25, 1921. Serial No. 495,164.

*To all whom it may concern:*

Be it known that I, WILLIAM B. YOUNG, a citizen of the United States, and a resident of Chicago, in the county of Cook and State of Illinois, have invented a new and useful Improvement in Wood-Carving Machines, of which the following is a full, clear, and exact description.

My invention relates to wood carving machines, and it consists in the combinations, constructions and arrangements herein described and claimed.

An object of my invention is to provide a wood carving machine having means for effecting duplicate carving simultaneously on a desired number of articles arranged in a plurality of groups or sets of four articles each.

A further object of my invention is to provide a device of the character described in which a plurality of driven spindles are arranged in groups or sets of four each and each set of driven spindles may be actuated independently of the remaining spindles.

A further object of my invention is to provide a device of the character described in which means are provided for holding a plurality of articles in adjusted positions with respect to one another and to the carving tools, whereby all articles may be turned about their respective axes simultaneously to insure the exact duplication of a pattern on all articles.

A further object of my invention is to provide a wood carving machine having means for supporting work for movement in a horizontal plane and having means for supporting a plurality of driven spindles in sets of four spindles, such means being capable of universal movement.

A further object of my invention is to provide a device of the character described in which the driven spindles and the working frame are movably supported independently of each other, whereby vibrations of the work and of the cutting tools are reduced to a minimum.

A further object of my invention is to provide a device of the character described in which the driven spindles and the means for driving the same are suspended from hangers in adjusted relative positions and are provided with counterweights to afford ease of movement and adjustment.

Other objects and advantages will appear in the following specification, and the novel features of the invention will be particularly pointed out in the appended claims.

My invention is illustrated in the accompanying drawings, forming part of this application, in which—

Figure 1:
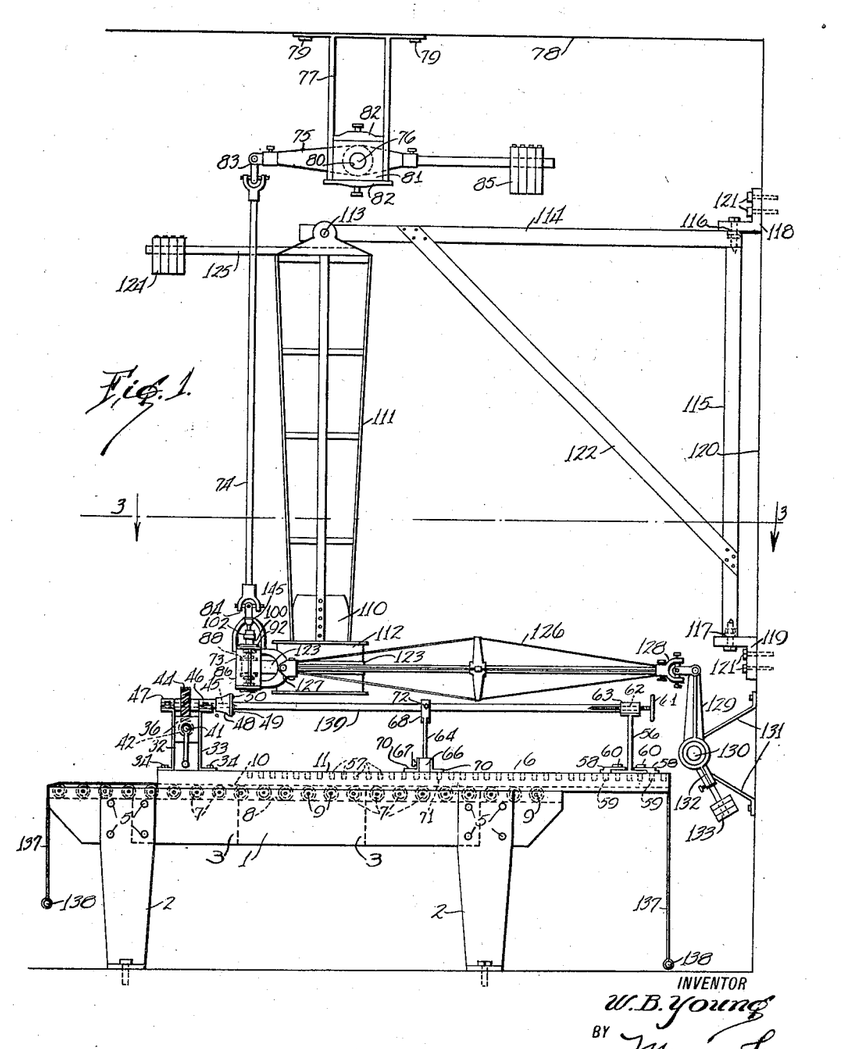
Figure 1 is a side elevation of the device.
Figure 5:
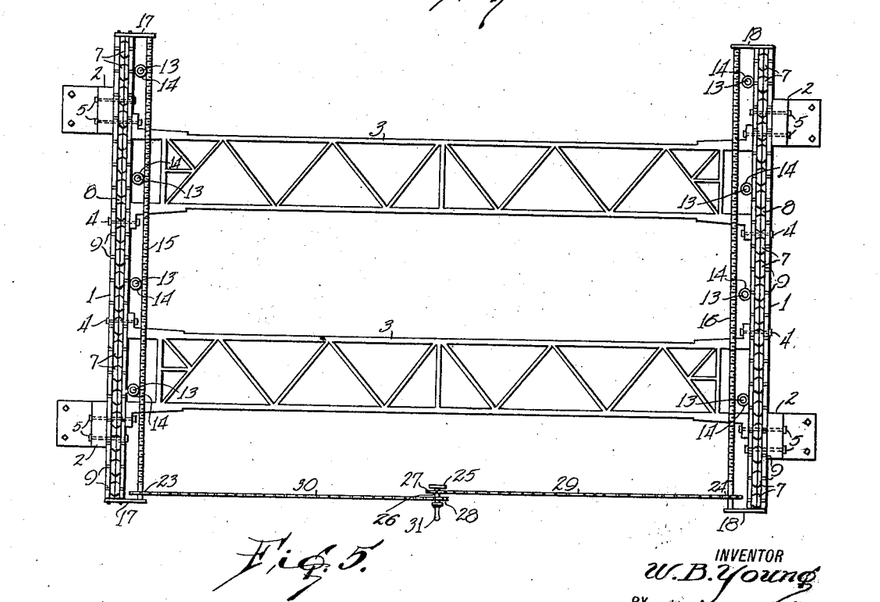
Figure 5 is a plan view of a supporting table or frame embodied in the device.

In carrying out my invention, I provide a supporting frame or table that comprises parallel horizontally disposed side members 1—1 supported on legs 2 and connected by cross members which are preferably trusses 3 (see Figures 1 and 5). The latter are rigidly secured to the side members 1—1 by bolts 4, or the like, and to both the side members 1—1 and the legs 2 by other bolts 5, whereby a substantially rigid supporting structure is provided.

A working frame or bed, indicated generally at 6 (see Figure 1) is movably supported on roller bearings 7. The latter are supported to depend into grooves 8—8 that extend the entire length of the side members 1—1, and to this end, each of the roller bearings 7 is rotatably mounted on a shaft 9 fixed in the sides of the grooves 8, as best seen in Figure 5. The peripheral wall of each of the roller bearings 7 is beveled oppositely from a line intermediate its length and each roller is partly disposed in a groove 10 in the under surface of a side member 11 of the working frame. It will be observed that the working frame comprises two of the side members 11. These members are horizontally disposed and are connected by trusses 12 so that each side member 11 overlies the corresponding side member 1 of the supporting frame and the groove 10 in the under surface of the side member 11 is arranged to register with the groove 8 in the upper surface of the corresponding side member 1. The grooves 10 are formed with converging walls so that the peripheral walls of the roller bearings 7 have close rolling contact with the grooves 10—10 and play between the working frame 6 and the supporting frame is prevented. As an additional means for preventing play or movement of the working frame relatively to the supporting frame, I provide a plurality of spaced apart right angular supporting rods or standards 13. These standards are attached to the inner sides of the side members 1 in spaced apart relation so that the free end portions thereof are vertically disposed and each carries a roller 14 arranged to bear against the inner side of the adjacent side member 11. It will be observed that the grooves 10 in the under surfaces of the side members 11 of the working frame provide a track engaged by the rollers 7 and the working frame may therefore be moved along the side members 1. In order to prevent any undue stress being placed on one of the side members when the working frame is moved that might move the side members 11 out of alinement with the side members 1, I provide a pair of screw rods 15 and 16. The screw rod 15 is journaled in bracket arms 17—17 attached to one side member 1 and extending laterally thereof, while the screw rod 16 is journaled in similar bracket arms 18—18 attached to the other side member 1 at its ends and extending laterally thereof, as best seen in Figure 5. The screw rods 15 and 16 are parallel with one another and with the side members 1—1. A bracket arm 19 projects laterally of one of the side members 11 of the working frame and carries a threaded sleeve 20 through which the screw rod 15 is threaded. A similar bracket arm 21 is attached to the other side member 11 and carries a threaded sleeve 22 through which the screw rod 16 is threaded. The screw rod 15 is provided with a sprocket 23 at its forward end. A similar sprocket 24 is rigidly mounted on the screw rod 16 at the forward end of the latter. A pedestal 25 disposed midway between the side members 1—1 is equipped with a freely rotatable horizontally extending shaft 26. A sprocket 27 is rigidly mounted on the shaft 26 in alinement with the sprocket 24 and a similar sprocket 28 is rigidly mounted on the shaft 26 in alinement with the sprocket 23. A chain 29 provides a driving connection between the sprocket 27 and the sprocket 24, and a similar chain 30 is arranged in engagement with the sprocket 23 and the sprocket 28. It will be manifest that the working frame 6 will be moved on the rollers 6 along the supporting frame when the shaft 26 is rotated, as by means of a crank arm 31.

The front or head stock of the working frame includes parallel members 32 and 33 disposed transversely of the working frame adjacent to its forward end. The members 32 and 33 may have the form of channel irons arranged with their webs in vertical position and with their lower flanges secured to the side members 11—11 by means of bolts 34, or the like. The members 32 and 33 are connected at their ends by cross members 35 and 36. A plurality of bearing members 37 are held in axial alinement between the members 32 and 33 by retaining and adjusting screws 38 projected through retaining rings 39, each of the retaining rings being attached to the member 32 by a screw 40, or like fastening means. A shaft 41 is journalled in the bearings 37 and in the end pieces 35 and 36. The shaft 41 is equipped with a plurality of worm gears 42 that are rigidly mounted thereon or may be formed integrally therewith, and with a worm gear 43 that is mounted thereon and detachably secured thereto. In the present instance, I have provided sixteen of the worm gears 42 and have arranged the same in sets of fours, there being two sets of worm gears at each side of the worm gear 43. Each of the worm gears 42 is in mesh with a gear 44 rigidly mounted on a shaft 45. Each shaft 45 is journalled in bearings 46 and 47 secured respectively to members 33 and 32, whereby the shafts 45 are arranged in parallelism and to extend transversely of the members 32 and 33. Each shaft 45 extends beyond the member 32 and carries a center 48 formed to provide a flat face 49 equipped with forwardly projecting spikes or spurs 50. The worm gear 43 is in mesh with a gear 51. The latter is rigidly mounted on a shaft 52 journalled in bearings 53 and 54 carried by the members 33 and 32 respectively. The shaft 52 is similar to the shafts 45 and is equipped at its forward end with a center 55 that is precisely identical with the centers 48. The centers 48 constitute the head or front centers of the device, as will be pointed out hereinafter.

The tail stock of the working frame or bed comprises a member 56 arranged parallel with the members 32 and 33. The member 56 has the general form of an I-beam having its bottom flange resting upon the side members 11—11 of the frame 6. Each of the side members 11—11 is provided with a series of sockets 57 in its upper side, corresponding sockets of the two side members being alined. Pairs of clamping members 58—58 have depending pin extensions 59 adapted to enter the sockets 57. Set screws 60 carried by the clamping members 58—58 are manipulated to engage the lower flange of the member 56 at opposite sides of its web to releasably clamp the member 56 securely to the frame members 11—11 in an adjusted position with respect to the head stock members 32 and 33. A plurality of tail centers 61 are provided, there being a tail center for each of the head centers 48 and 55. Each tail center 61 is threaded through an opening 62 in a boss 63 of the tail stock member 56 in alinement with a corresponding head stock center.

Figures 6, 7, 8, 9, 10, 11:
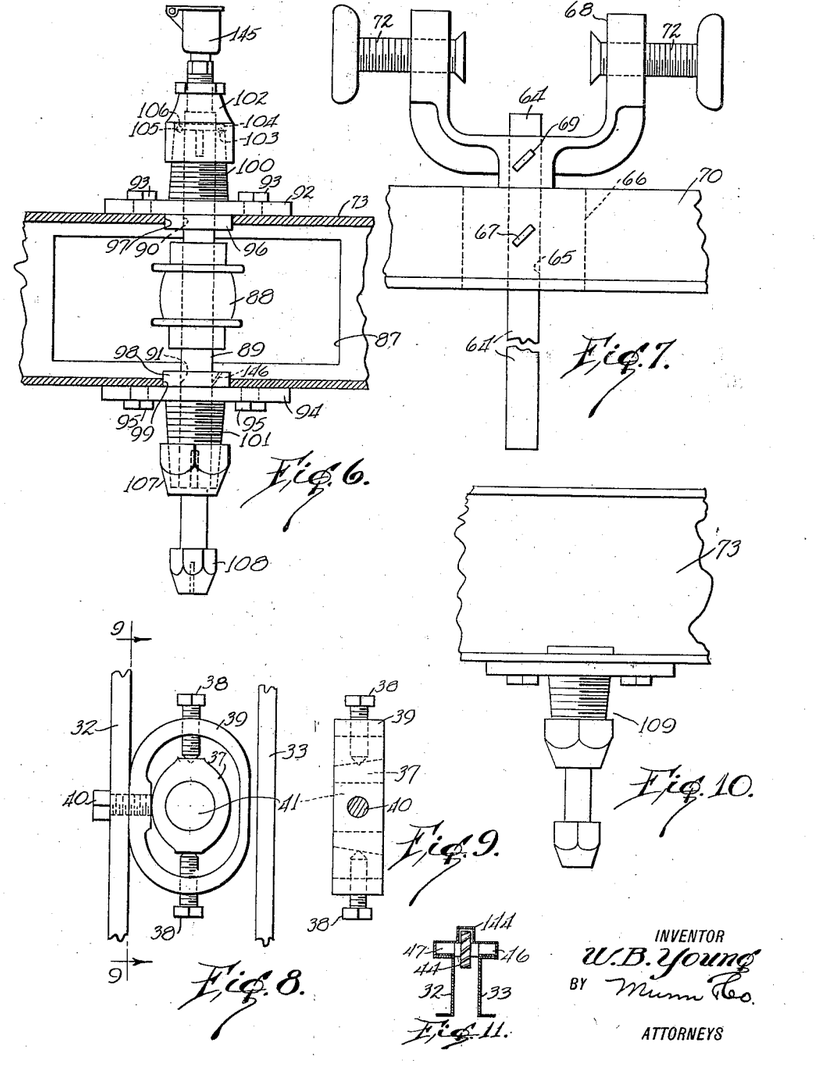
Figure 6 is a detail, partly in section, of one of the driven spindles incorporated in the device, and of a fragmentary portion of the spindle-carrying frame.
Figure 7 is a detail of a work-supporting rest embodied in the device.
Figure 8 is a detail of a fragmentary portion of the working frame or bed.
Figure 9 is a view along the line 9—9 of Figure 8.
Figure 10 is a side elevation of a portion of the spindle-carrying frame and of the follower holder carried thereby.
Figure 11 is a section through the head stock and through a cover therefor.

It is desirable that means be provided for supporting intermediately work held between the head and tail centers. To this end I provide a plurality of intermediate work rests. Each of the latter comprises a standard 64 received in a vertical bore 65 of a block 66 and maintained in adjusted vertical position by means of a set screw 67. A substantially U-shaped frame 68 is slidably disposed on the standard 64 above the block 66 and is held in adjusted position with respect to the latter by means of a set screw 69. The blocks 66 are held between a pair of angle iron members 70—70. The latter are arranged to extend transversely of the frame members 11—11 and are provided with depending pins 71 received in the sockets 57. It will be observed that the set screw 67 is projected through one of the angle iron members 70 into the block 66 for engagement with the standard 64 in the manner described. The U-shaped frame 68 is disposed on the standard 64 with its arms upstanding, and axially alined clamping screws 72—72 are carried by these arms for engaging the work. The blocks 66 correspond in number with the head centers 48 and 55 and are relatively arranged so that each article of work held between alined head and tail centers may be clamped between the adjustable clamping screws 72—72 and the article of work thus securely held against movement. This is important in the event that the article of work comprises a relatively thin longitudinal member, such as a rod.

Figure 2:
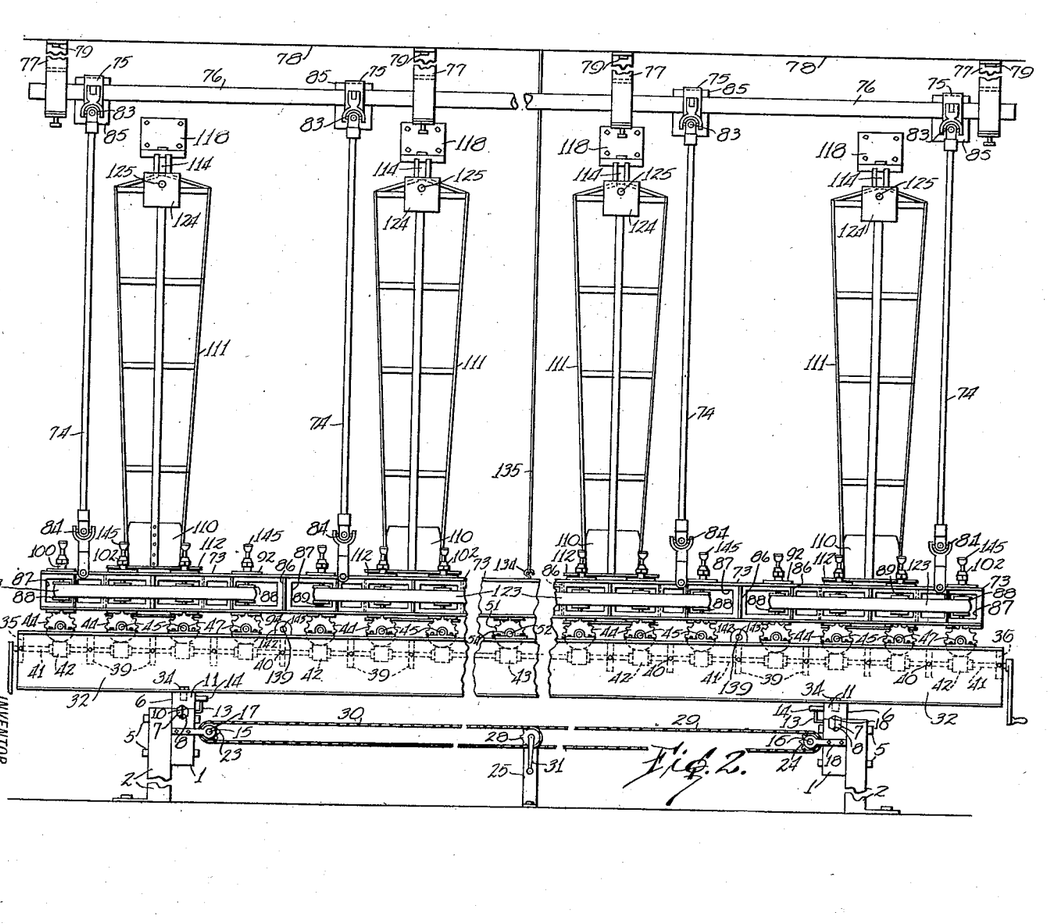
Figure 2 is a front view of the same.
Figure 3:
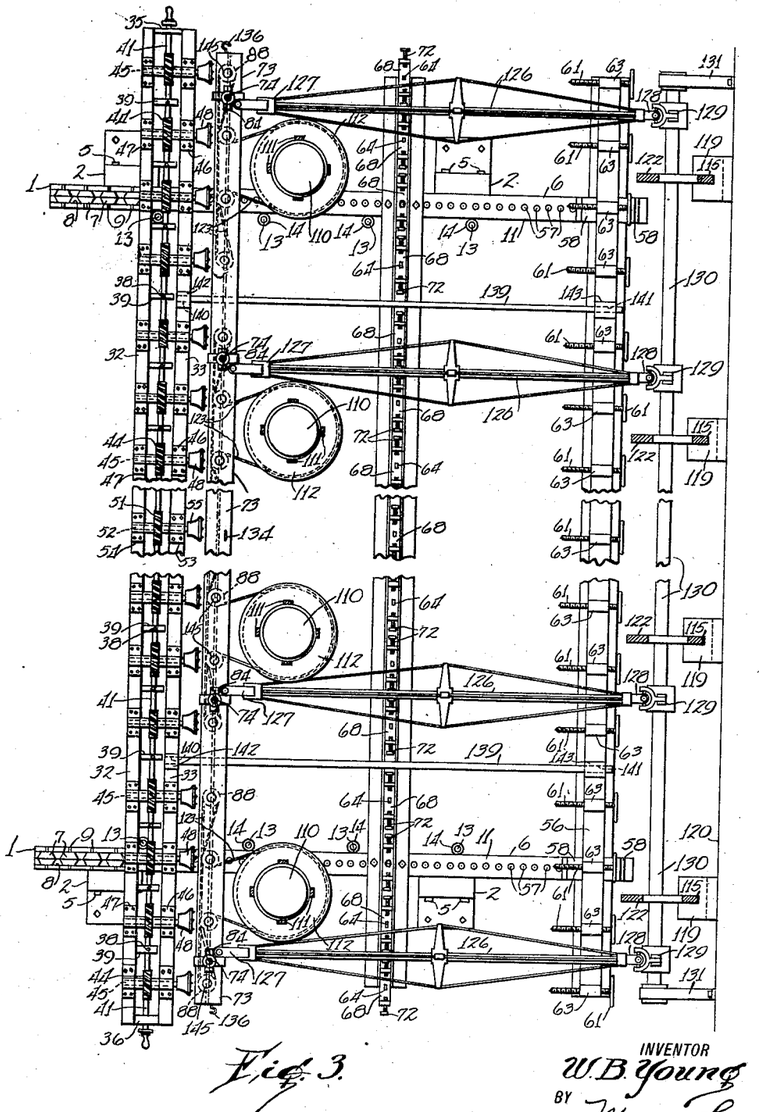
Figure 3 is a section along the line 3—3 of Figure 1.
Figure 4:
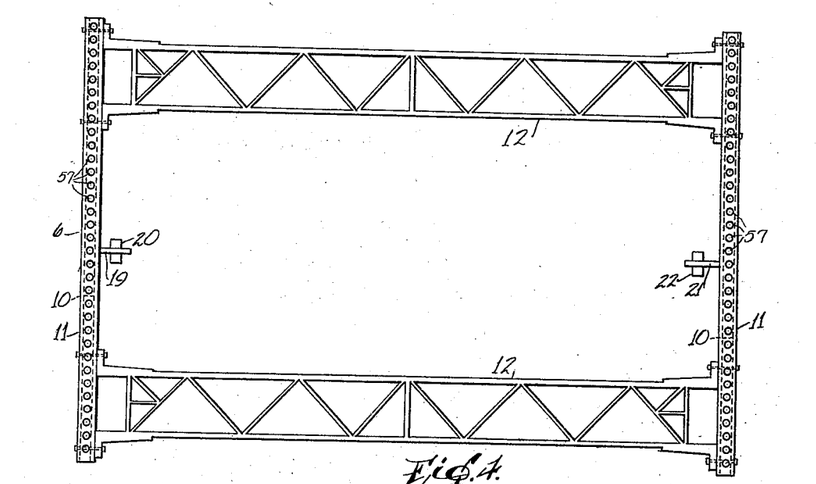
Figure 4 is a plan view showing the frame work structure of a working frame embodied in the device.

In many types of wood carving machines now in use, of which I am aware, the means for supporting the carving tools is connected with the means for supporting the working bed or carried by the latter. In consequence, vibrations of the supporting frame and of the working frame are transmitted to the means supporting the carving tools and this has detrimentally affected the accuracy of duplicate carving. To preclude the transmission of vibrations from the supporting frame or working frame to the carving tools, or vice versa, I provide means independent of the supporting table and the working frame 6 for operatively supporting the carving tools and the means for actuating the latter. To this end a spindle-carrying frame 73 is suspended by hanger rods 74 from beams 75 mounted intermediately on a horizontal shaft 76 carried by hangers 77. The hangers 77 are attached to a ceiling 78 by means of screws 79, or the like (see Figures 1 and 2). The shaft 76 is received in axially alined openings 80 in blocks 81 held between pairs of the hanger rods by retaining members 82. It is important to note that I provide a beam 75 for each set of the head centers 48. A like number of the hanger rods 74 is provided. Each of the hanger rods 74 is connected at its upper end by a universal joint arrangement 83 with the corresponding beam 75 at one end of the latter. Each hanger rod 74 is connected at its lower end by a universal joint arrangement 84 with the spindle-carrying frame 73. The latter will be suspended in horizontal position slightly above the head centers 48, as best seen in Figure 1, when the beams 75 are maintained in horizontal positions. This is accomplished by means of counterweights 85 placed on the beam 75 at its free end and secured in position thereon to balance the weight of the elements carried by the beam 75 at its opposite end.

The spindle-carrying frame 73 has the general form of an I-beam provided with integral transverse strengthening ribs 86 at spaced apart points along its length. The web of the I-beam is cut away at points between the strengthening ribs 86 to provide series of apertures 87. In each of these apertures is disposed a pulley 88 that is rigidly mounted on a vertical spindle 89. The spindle 89 projects through vertically alined openings 90 and 91, respectively, in an upper carrying plate 92 that is secured to the upper side of the upper flange of the spindle-carrying frame by means of bolts 93, or the like, and in a lower carrying plate 94 that is attached to the under side of the lower flange of the spindle-carrying frame by bolts 95. The carrying plate 93 is fashioned with an integral boss 96 disposed in an opening 97 in the upper flange of the spindle-carrying frame, and the lower bearing plate 94 is likewise provided with an integral boss 98 disposed in an opening 99 in the lower flange of the spindle-carrying frame. The bearing plates 92 and 94 are respectively formed with vertically alined tubular extensions 100 and 101 receiving the spindle 89. The extension 100 is tapering in form and is threaded exteriorly for engagement with an adjusting cap 102. The tubular extension 100 is also preferably split adjacent to its ends so that any play between the spindle 89 and the extension 100 will be taken up when the cap 102 is tightened. The extension 100 is fashioned to provide an annular ball race 103 in its upper end. A collar 104 rigidly mounted on the spindle 89 and received within the cap 102 rests upon ball members 105 disposed partly in the annular groove 103 and partly in a cooperating annular groove 106 in the lower end of the collar 104. The spindle 89 is therefore supported anti-frictionally for rotation. The depending tubular extension 101 is tapered and threaded exteriorly for engagement with an adjusting nut 107. The extension 101 is preferably split adjacent to its lower end so that play between its bore and the spindle will be prevented when the nut 107 is tightened. A tool-receiving chuck 108 is carried by each spindle 89 at its lower end.

As hereinbefore stated, the spindles 89 are relatively arranged so that there is a spindle for each of the head or front centers 48. A follower holder 109 is carried by the spindle-carrying frame in the same relative relation to the head center 55 as each of the spindles 89 has to a corresponding head center 48.

A motor 110 is provided for each set of four spindles 48. Each motor is carried by a hanger frame 111 so that a drive pulley 112 rigidly secured on its drive shaft will be arranged for rotation about a vertical axis. Each hanger frame 111 is pivotally attached at its upper end, as at 113, to a horizontal arm 114 arranged to project laterally of a vertical shaft 115 rotatably supported at its ends, as at 116 and 117, between vertically alined brackets 118 and 119. The brackets 118 and 119 are attached to a wall 120 or other vertical support by means of screws 121, or the like. The horizontal arm 114 is stayed by a brace 122.

A belt 123 is passed around each of the drive pulleys 112, around the end pulleys 88 mounted on the remote spindles of the set of four spindles associated therewith, and arranged to engage with the pulleys 88 mounted on the intermediate spindles of the set. The four pulleys 88 of each set will therefore be driven by belt connection with one drive pulley at the same speed. The intermediate spindles of each set are arranged in alinement with each other and in advance of the end spindles of each set to preclude frictional contact of adjacent portions of the belt 123 at points close to the intermediate pulleys. It is important to note that the diameter of each drive pulley 112 is greater than the distance between the intermediate pulleys 88 of each set. In consequence, an equal torque will be imparted to each pulley of a set. The length of each drive pulley 112 is also considerably greater than the length of each of the driven pulleys 88 and the spindle-carrying frame may therefore be moved vertically relatively to the drive pulley 112 without interfering with the operative connection of the drive pulley with the driven pulleys. Each belt 123 is normally maintained taut on account of the action of counterweights 124 carried at the outer end of an arm 125 attached to the hanger frame 111 and projecting laterally of the upper end of the latter. A compound tie member, indicated generally at 126, is connected at one end by a universal joint arrangement 127 with the spindle-carrying frame 73, and at its other end by a universal joint 128 with a vertical beam 129 pivotally supported on a horizontal shaft 130. The latter is carried by a plurality of brackets 131 attached to the wall 120. It will be observed that I provide four of the compound tie members 126 and a like number of the beams 129. Each of the beams 129 has an integral depending arm 132 that is inclined from the vertical. Weights 133 are adjustably supported on the arm 132 and cooperate with the weights 85 carried by the horizontal beams 75 to insure the balancing of the spindle-carrying frame 73 when the latter has been moved into any position possible in view of its connections. It will be manifest that the spindle-carrying frame may be readily moved in any direction easily on account of the balanced construction described in the foregoing. The spindle-carrying frame is equipped with a hook 134 intermediate its length, and a cable 135 depending from the ceiling may be attached to the hook 134 to limit the movement of the spindle-carrying frame downwardly and to thus preclude the possibility of injury to the carving tools (not shown). Hooks 136—136 are carried by the spindle-carrying frame at opposite ends thereof and a retractile spring (not shown) may be employed to connect each of the hooks 136 with an adjacent wall or other structure to exert a tension on the spindle-carrying frame. A shield 137, which may be a strip of canvas or other flexible material, is attached at one end to an end of the working frame 6 and is provided with a weight 138 at its free end (see Figure 1). The flexible shield overlies the roller wheels 7 exposed when the working frame or bed is moved along the supporting table and prevents the accumulation of chips, dust, and the like on the roller wheels.

From the foregoing description of the various parts of the device, the operation thereof may be readily understood. A plurality of articles to be carved are placed between the head centers 48 and the tail centers alined therewith. The pattern is placed between the head center 55 and the tail center alined therewith. The tail stock member 56 can be moved relatively to the head stock in the manner described in the foregoing to accommodate work of various lengths. Each article of work may be supported intermediately, if desired, by the intermediate work-supporting rest. A plurality of guide rods 139 are provided to prevent any movement of the tail stock member 56 when it is being adjusted with respect to the head stock that would tend to move corresponding head and tail centers out of alinement with each other. Each of the guide rods 139 is slidably received in alined openings 140 and 141 in bosses 142 and 143, respectively, integral with the head stock member 33 and the tail stock member 56.

When the articles of work and the pattern have been placed in desired positions, the follower (not shown) carried by the follower holder 109 is moved along the pattern and the carving tools carried by the several spindles 89 will be correspondingly moved along the several articles of work to effect the carving of all articles of work in a precisely identical manner. With the device illustrated, a desired pattern may be carved on sixteen articles of work simultaneously. Since the spindles are arranged in sets of four and a separate driving means is provided for each set, any desired number of articles, not exceeding sixteen, may be carved at the same time with the machine illustrated. Obviously, I may provide a greater or less number of sets of spindles without departing from the spirit and scope of the invention. In the event that it is desired to rotate the articles of work, as for instance, if the carving is to extend entirely around a rod, the shaft 41 may be rotated manually. In consequence, each of the gears 44 will be operated and the shafts 45 will be rotated simultaneously, thereby turning all articles of work engaged by the head centers 48 simultaneously and in a like manner. In the event that the worm gear 42 is secured to the shaft 41 to rotate therewith, the pattern engaged by the head center 55 will likewise be turned in synchrony with the several articles of work. As pointed out in the foregoing, the worm 43 is releasably attached to the shaft 41 and in consequence the pattern may be maintained stationary while the articles of work are turned as desired. A cover 144 (see Figure 11) houses the shaft 41 and the gears associated therewith.

Since the spindle-carrying frame 73 and the spindle-driving means are movably supported by means entirely independent of the working frame or bed 6, carvings of greater width may be made than has heretofore been possible without resetting the articles of work. Vibrations of the working frame or supporting frame are not communicated to the spindle-carrying frame and vibrations of the latter are not communicated to the working frame. In consequence, the carving of a number of articles of work in duplicate may be effected with absolute accuracy and the objectionable pock markings occasioned by vibration when wood carving machines of ordinary construction, of which I am aware, are used, are obviated.

Each of the spindles 89 is equipped with an oil cup 145 that is mounted on the cap 102 and is arranged to feed a lubricant between the spindle 89 and its bearings. An oil passage 146 leading from the upper surface of the lower flange of the spindle-carrying frame through the bearing plate 91 is also provided for each spindle 89. The latter is therefore maintained in a thoroughly lubricated condition.

One of the important features of the invention is the balanced construction which affords ease of manipulation of the spindle-carrying frame as a unit. A greater number of articles of work may therefore be carved with a minimum of power consumption when my device is used than has heretofore been possible. The means for supporting each motor is perfectly balanced, as has been pointed out, so that the drive belts are maintained in operative engagement with the driven pulleys.

I claim:

1. A device of the character described comprising a supporting frame, a working frame movably supported thereon, a head stock supported on the working frame, a plurality of head centers rotatably supported on the head stock, one of said head centers being adapted to engage with a pattern and the remaining head centers being arranged in similar sets and each being adapted to engage with an article of work to be carved, a tail stock supported on the working frame, a tail center carried by the tail stock for each head center, said tail centers being alined respectively with the corresponding head centers, other means carried by the working frame for supporting the articles of work and the pattern approximately midway between the head stock and the tail stock, a spindle-carrying frame, a plurality of spindles carried by the spindle-carrying frame, the number and arrangement of the spindles being determined by the number and arrangement of the head centers adapted to engage with articles of work, means for movably supporting the spindle-carrying frame in a desired position with respect to the head stock, whereby each spindle is normally positioned adjacent to the corresponding head center, a follower holder carried by the spindle-carrying frame in a desired position with respect to the head center for engaging the pattern, and means for driving the spindles.

2. A device of the character described comprising a supporting frame, a working frame movably supported thereon, a head stock supported on the working frame, a plurality of head centers rotatably supported on the head stock, one of said head centers being adapted to engage with a pattern and the remaining head centers being arranged in similar sets and each being adapted to engage with an article of work to be carved, a tail stock supported on the working frame, a tail center carried by the tail stock for each head center, said tail centers being alined respectively with the corresponding head centers, a spindle-carrying frame, a plurality of spindles carried by the spindle-carrying frame, the number and arrangement of the spindles being determined by the number and arrangement of the head centers adapted to engage with articles of work, counterweighted means independent of the supporting frame and of the working frame for movably supporting the spindle-carrying frame in a desired position with respect to the head stock, whereby each spindle is normally positioned adjacent to the corresponding head center, a follower holder carried by the spindle-carrying frame in a desired position with respect to the head center for engaging the pattern, a driving means for the spindles of each set, and counterweighted means for movably supporting the driving means in desired positions with respect to the several sets of spindles.

3. In a device of the type described, a spindle carrying frame having a universal movement, a fixed support, a motor carrying frame pivotally carried by said support and being movable toward and away from said spindle carrying frame, a pulley secured to said motor, a belt operatively connecting said pulley with said spindles, and means for yieldingly holding said pulley in engagement with said belt.

4. In a device of the type described, a spindle carrying frame having a universal movement, a fixed support, a motor carrying frame pivotally carried by said support and being movable toward and away from said spindle carrying frame, a relatively wide pulley secured to said motor, a belt operatively connecting said pulley with said spindles, and means for yieldingly holding said pulley in engagement with said belt, said spindle carrying frame being adapted to move vertically with respect to said pulley.

5. In a device of the type described, a balanced spindle carrying frame having a universal movement, a fixed support, a motor carrying frame pivotally carried by said support and being movable toward and away from said spindle carrying frame, a pulley secured to said motor, a belt operatively connecting said pulley with said spindles, and means for yieldingly holding said pulley in engagement with said belt.

6. In a device of the type described, a balanced spindle carrying frame having a universal movement, a fixed support, a motor carrying frame pivotally carried by said support and being movable toward and away from said spindle carrying frame, a relatively wide pulley secured to said motor, a belt operatively connecting said pulley with said spindles, and means for yieldingly holding said pulley in engagement with said belt, said spindle carrying frame being adapted to move vertically with respect to said pulley.

7. In a device of the type described, a spindle carrying frame having a universal movement, a fixed support, a motor carrying frame having a universal connection with said support, a motor carried by said motor carrying frame, a relatively wide pulley carried by said motor, a belt operatively connecting said pulley with said spindles, and means for yieldingly holding said pulleys in engagement with said belt, whereby said spindle carrying frame is adapted to move with respect to said pulley.

WILLIAM B. YOUNG.